(12) United States Patent
Gómez García et al.

(10) Patent No.: US 12,368,407 B2
(45) Date of Patent: Jul. 22, 2025

(54) SUPPORTING SYSTEM FOR ROTATING SHAFTS AND SOLAR TRACKER WITH SAID SYSTEM

(71) Applicant: TRINA SOLAR, S.L.U., Madrid (ES)

(72) Inventors: Juan Manuel Gómez García, Madrid (ES); Alfonso Caballero Ruiz, Madrid (ES); Jose Ignacio Lopez Ayarza, Madrid (ES); Abraham Ruiz Molinero, Madrid (ES)

(73) Assignee: TRINA SOLAR SPAIN, S.L.U., Madrid (ES)

( * ) Notice: Subject to any disclaimer, the term of this patent is extended or adjusted under 35 U.S.C. 154(b) by 22 days.

(21) Appl. No.: 18/509,206

(22) Filed: Nov. 14, 2023

(65) Prior Publication Data

US 2024/0213912 A1    Jun. 27, 2024

(30) Foreign Application Priority Data

Dec. 21, 2022   (ES) .................................. 202232135

(51) Int. Cl.
*H02S 20/32*    (2014.01)

(52) U.S. Cl.
CPC .................................... *H02S 20/32* (2014.12)

(58) Field of Classification Search
CPC ........................................................ H02S 20/32
See application file for complete search history.

(56) References Cited

FOREIGN PATENT DOCUMENTS

WO    2016094864 A1    6/2016

*Primary Examiner* — Tae-Sik Kang
(74) *Attorney, Agent, or Firm* — LUCAS & MERCANTI, LLP

(57) ABSTRACT

A supporting system for rotating shafts (3) which can be arranged inclined with respect to one another having a supporting pillar (2.1), a first rotating shaft (3.1) which is supported on the supporting pillar (2.1) by a first bearing assembly (5.1), and a second rotating shaft (3.2) which is supported on the supporting pillar (2.1) by a second bearing assembly (5.2), the first bearing assembly (5.1) and/or the second bearing assembly (5.2) having a spherical bearing (5.4) capable of rotating freely both about the corresponding rotating shaft (3, 3.1, 3.2) and out of the plane perpendicular to the rotating shaft (3), (3.1), (3.2).

10 Claims, 10 Drawing Sheets

SUPPORTING SYSTEM FOR ROTATING SHAFTS AND SOLAR TRACKER WITH SAID SYSTEM

CROSS-REFERENCE TO RELATED APPLICATION

This application claims priority of Spanish Application No. U 202232135, filed Dec. 21, 2022, the content of which is incorporated herein by reference.

TECHNICAL FIELD

The present invention relates to a supporting system for rotating shafts, more specifically a supporting system for rotating shafts suitable for a solar tracker.

STATE OF THE ART

Today, solar trackers are known to be used in solar installation structures, where said solar trackers are configured to automatically orient photovoltaic panels according to the position of the sun at any given moment, by means of rotating a rotating shaft to which the photovoltaic panels are fixed, increasing the incidence of sunlight on these panels throughout the day and thereby increasing electricity generation.

When solar trackers are to be installed on uneven or irregularly shaped terrain, problems with the orientation of the rotating shafts of the solar tracker often arise, where a single rotating shaft is used to support and rotate a set of photovoltaic panels belonging to one and the same row of the solar tracker, in this case the photovoltaic panels occupy a large longitudinal space, such that a long time is required to correctly orient the rotating shaft of the solar tracker, which in turn increases the cost of assembling the solar tracker.

To that end, solar trackers are known such as, for example, the one disclosed in PCT application with publication number WO2016094864A1, in which instead of comprising a single rotating shaft per row of solar tracker, it comprises several rotating shafts connected to one another by means of articulated joints that transmit rotation from one rotating shaft to the next, and in which said articulated joints are supported on the pillars, allowing the different rotating shafts of the row of solar tracker to be inclined with respect to the pillars and to other rotating shafts, which reduces the cost of assembling these solar trackers.

However, since the rotating shafts are at different inclinations, the photovoltaic panels Fixed to said axes of rotation, they are also inclined longitudinally with respect to other photovoltaic panels. This has the drawback of a decreased electricity generation, since the photovoltaic panels with a longitudinal inclination different from to the rest of the photovoltaic panels must be rotated at an angle different from the rest of the photovoltaic panels so as to maximize electricity generation.

Therefore, there is a need for a supporting system for rotating shafts which allows a greater inclination of the rotating shafts with respect to the pillars on which they are supported, and at the same time allows the independent rotation of each rotating shaft.

OBJECT OF THE INVENTION

In order to achieve this objective and solve the technical problems discussed so far, in addition to providing additional advantages that can be derived below, the present invention provides a supporting system for rotating shafts which can be arranged inclined with respect to one another, comprising:
- at least one supporting pillar,
- a first rotating shaft, which is supported on the supporting pillar by means of a first bearing assembly, and
- a second rotating shaft which is supported on the supporting pillar by means of a second bearing assembly, characterized in that the first bearing assembly and/or the second bearing assembly comprises a spherical bearing capable of rotating freely both about the corresponding rotating shaft and out of the plane perpendicular to the rotating shaft.

With this supporting system, the rotating shafts successfully overcome the unevenness and irregularities of the terrain by allowing the inclination of at least one rotating shaft with respect to the pillar and independently of the inclination of at least another rotating shaft, which in turn allows reducing the cost of installing the structure, since it is not necessary to custom manufacture each element of the structure (pillars, rotating shafts, etc.), in addition to preventing the corresponding cost overruns due to earthworks intended for reducing or eliminating irregularities of the terrain.

Preferably, the first rotating shaft and the second rotating shaft can be actuated independently with respect to one another, so the present supporting system allows the rotational movement of each rotating shaft to be independent of one another, which in the case of solar trackers allows maximizing electricity generation by allowing the photovoltaic panels fixed to each rotating shaft to be rotated at a specific angle that maximizes electricity generation.

It should be indicated that the rotating shafts being able to be actuated independently with respect to one another is understood to mean that a rotational movement can be generated on each rotating shaft independently.

Preferably, the first bearing assembly and/or the second bearing assembly comprises an inclinable support, which can be removably fixed to the supporting pillar in different inclination positions corresponding to different inclinations of the corresponding rotating shaft which is supported on the supporting pillar, in this manner, with the combination of a spherical bearing and an inclinable support, the inclination capacity of the rotating shaft with respect to the pillar is increased, increasing the terrain unevenness that can be overcome and facilitating the assembly of the structure.

Preferably, the support comprises fixing holes for fixing by screwing to the supporting pillar, which can be aligned with respective fixing holes of the supporting pillar in different fixing positions corresponding to the different inclinations of the corresponding rotating shaft which is supported on the supporting pillar.

Preferably, the supporting system comprises at least one actuation element fixed to the supporting pillar configured for rotating the first rotating shaft or the second rotating shaft, which facilitates assembly by utilizing the supporting pillar for installing the actuation element.

Likewise, given that each rotating shaft rotates by means of an independent actuation element, the rotation of each rotating shaft is independent of one another.

Examples of an independent actuation element may be a linear actuator and/or a rotation module connected to an electric motor.

Preferably, the supporting system comprises a plurality of supporting pillars on which respective first rotating shafts and second rotating shafts are supported, facilitating the ability of the system to overcome terrain irregularities given that the larger number of rotating shafts the better adaptability of the supporting system to overcome terrain irregularities.

Preferably, the supporting system comprises two side pillars on which respective first rotating shaft and second rotating shaft support by means of a third bearing assembly each end of the rotating shafts not supported on a supporting pillar, in this manner, the rotating shafts are supported at both ends by means of bearing assemblies that allow the rotation of the aforementioned rotating shafts.

Preferably, the third bearing assembly comprises a spherical bearing capable of rotating freely both about the corresponding rotating shaft and out of the plane perpendicular to the rotating shaft, and/or an inclinable support, which can be removably fixed to the supporting pillar in different inclination positions corresponding to different inclinations of the rotating shaft which is supported on the supporting pillar, allowing the inclination of each rotating shaft with respect to the pillars on which they are supported.

Preferably, the supporting system would be for a solar tracker with photovoltaic panels that can be oriented by means of rotating the rotating shafts, although the use thereof in other structures comprising a plurality of rotating shafts is not ruled out.

Finally, another object of the present invention relates to a solar tracker comprising the supporting system for rotating shafts of the present invention.

DETAILED DESCRIPTION OF THE INVENTION

The present invention relates to a supporting system for a plurality of rotating shafts (3) of a structure such as, for example, a solar tracker (1).

It is reiterated that, although described as embodiments of the present supporting system for use thereof in solar trackers (1), the use thereof in other structures comprising a plurality of rotating shafts (3) is not ruled out.

Figure 1:
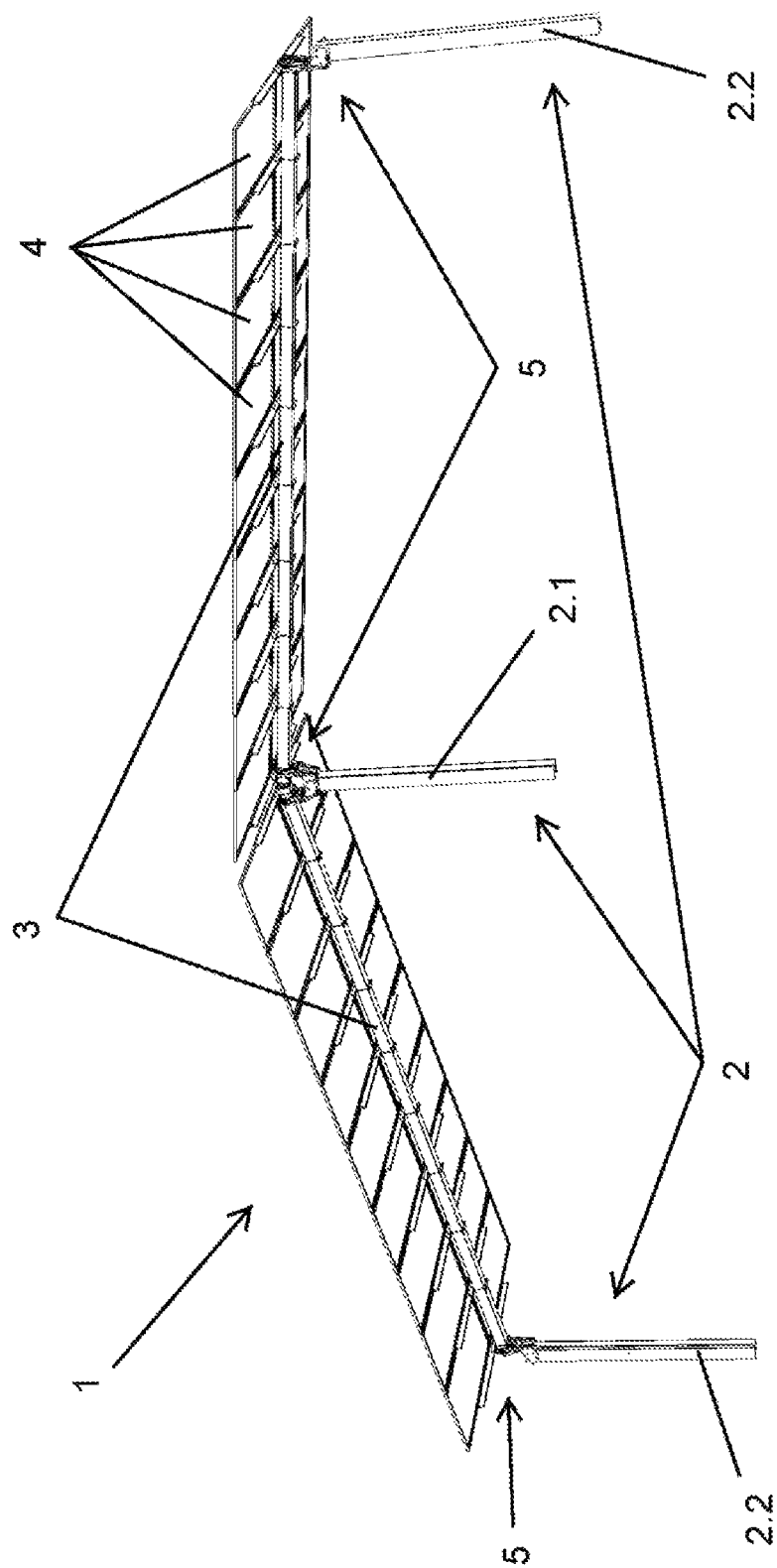
FIG. 1 shows a perspective view of a solar tracker according to a embodiment of the invention.

An example of a solar tracker (1), in which photovoltaic panels (4) are fixed to one of the two rotating shafts (3) of the solar tracker (1) by means of fixing devices, can be seen in FIG. 1.

Said rotating shafts (3) are supported at each of their ends on pillars (2), raising the photovoltaic panels (4) off the ground, thereby preventing the photovoltaic panels (4) from hitting the ground during the rotation of the rotating shafts (3).

The rotating shafts (3) are supported respectively on each pillar (2) by means of bearing assemblies (5), wherein the bearing assemblies (5) allow the rotation of the rotating shafts (3).

In this embodiment, a line of solar tracker (1) is made up of a first rotating shaft (3.1) and a second rotating shaft (3.2), wherein one end of the first rotating shaft (3.1) is supported on a supporting pillar (2.1) by means of a first bearing assembly (5.1) and the other end is supported on a side pillar (2.2) by means of a third bearing assembly (5.3).

Likewise, one end of the second rotating shaft (3.2) is supported on this supporting pillar (2.1) by means of a second bearing assembly (5.2), whereas the other end of the second rotating shaft (3.2) is supported on a side pillar (2.2), different from that on which the first rotating shaft (3.1) is supported, thereby forming a line of solar tracker (1).

It should be noted that, although in this embodiment the supporting system only comprises two rotating shafts (3), the presence of more rotating shafts (3), with their corresponding supporting pillars (2.1), is not ruled out.

Figure 2:
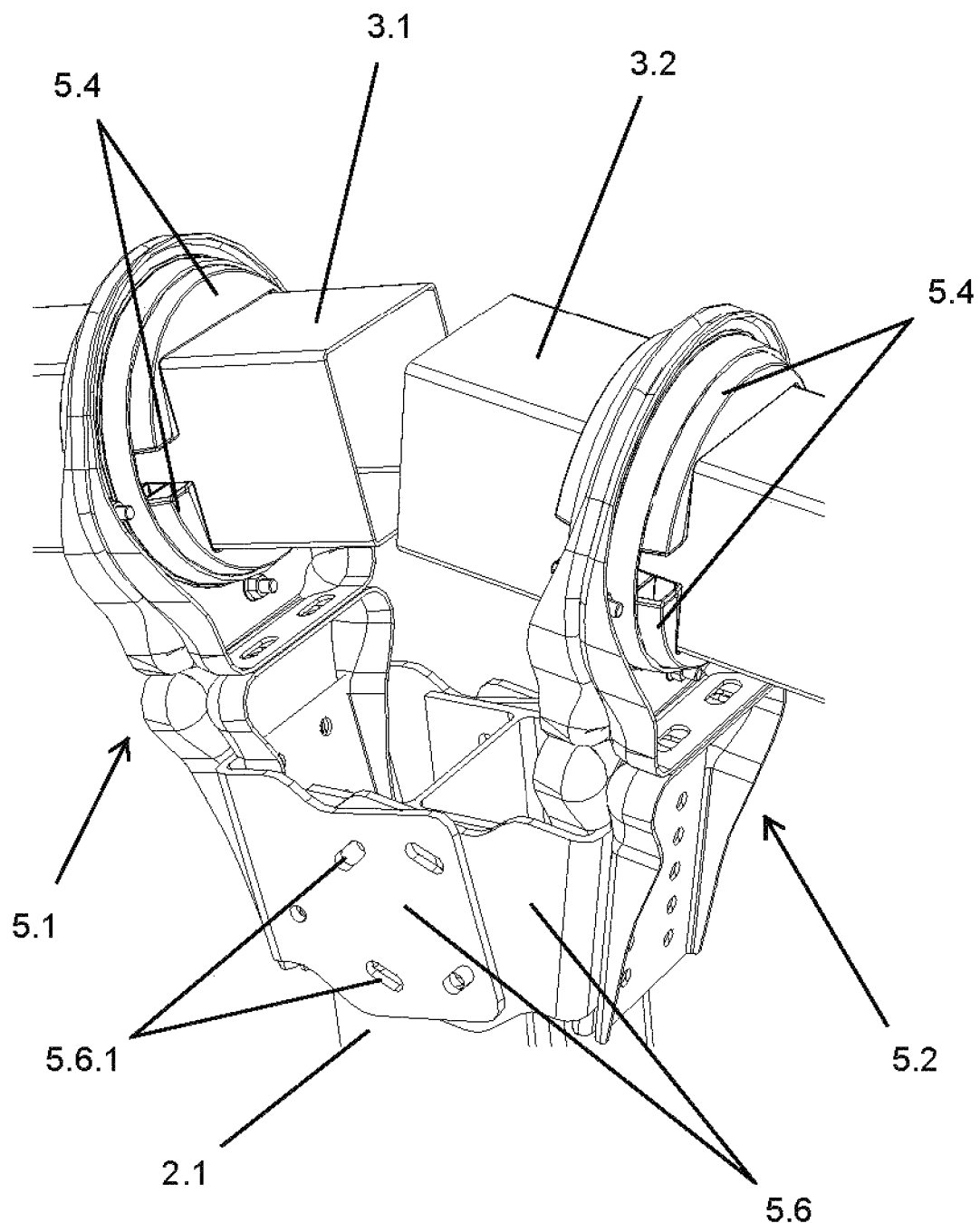
FIG. 2 shows a perspective view of the supporting pillar on which two rotating shafts are supported according to the embodiment of FIG. 1.
Figure 3:
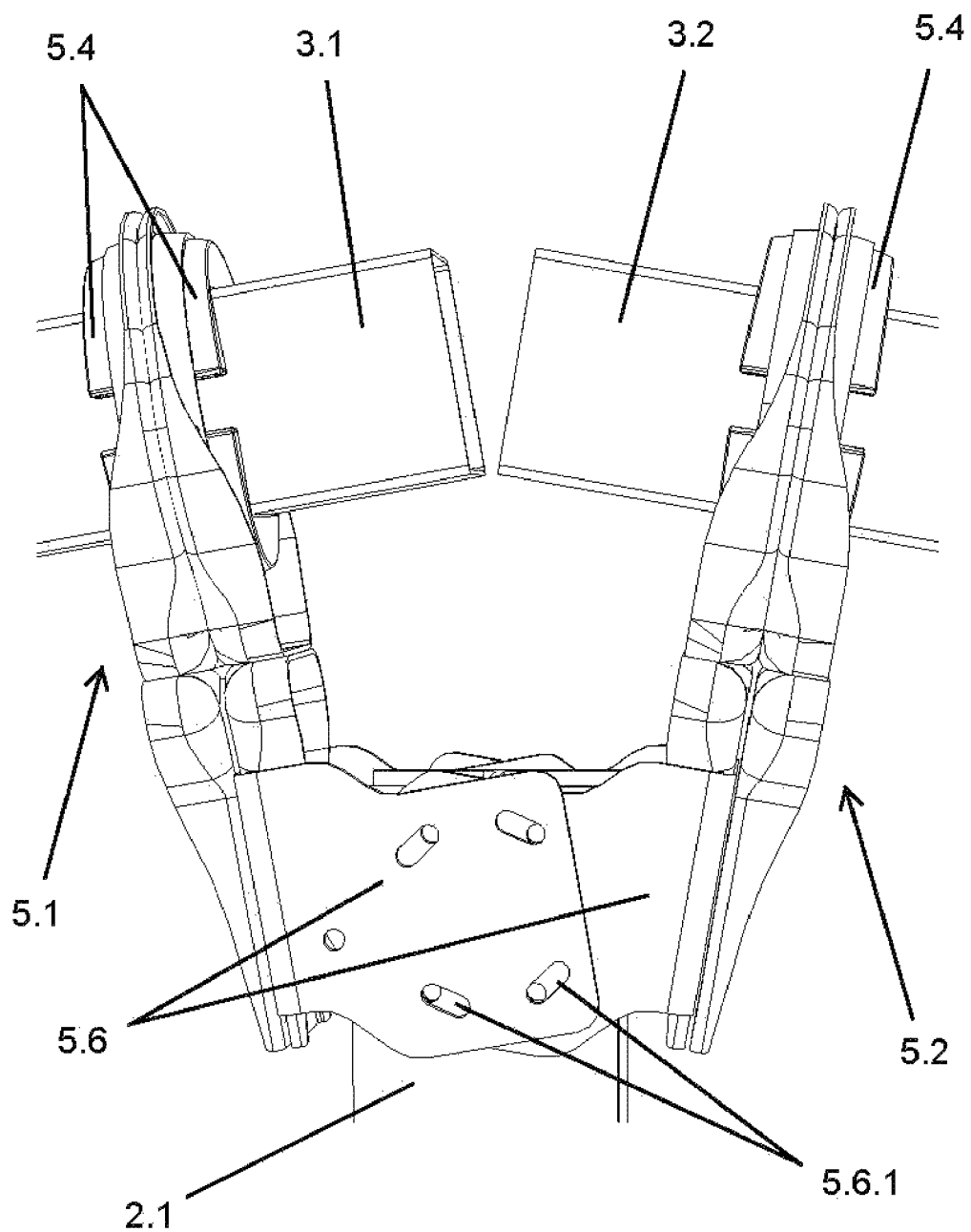
FIG. 3 shows a side view of the supporting pillar of FIG. 2.

The supporting pillar (2.1) of FIG. 1, wherein the first bearing assembly (5.1) comprises a spherical bearing (5.4) that allows the inclination of the first rotating shaft (3.1) with respect to the supporting pillar (2.1), overcoming the unevenness and irregularities of the terrain and allowing the rotation of the first rotating shaft (3.1), can be seen in more detail in FIGS. 2 and 3.

Additionally, the second bearing assembly (5.2) comprises a spherical bearing (5.4) that allows the inclination of the second rotating shaft (3.2) with respect to the supporting pillar (2.1) and of the first rotating shaft (3.1), which increases the ability to overcome unevenness and irregularities of the terrain, while allowing the independent rotation of the second rotating shaft (3.2) with respect to the first rotating shaft (3.1).

Likewise, both the first bearing assembly (5.1) and the second bearing assembly (5.2) comprise a support (5.6) for the fixing thereof to the supporting pillar (2.1), to that end, each support (5.6) comprises fixing holes (5.6.1) for fixing by screwing, such that these supports (5.6) can be aligned with respective fixing holes (5.6.1) of the supporting pillar (2.1).

Additionally, the fixing holes (5.6.1) of the support (5.6) are elongated holes, so they allow the first bearing assembly (5.1) and the second bearing assembly (5.2) to be installed in different fixing positions corresponding to different inclinations of the rotating shaft (3) it supports.

In this way, with the combination of the spherical bearing (5.4) and the inclinable support (5.6), the inclination capacity of the rotating shaft (3) with respect to the supporting pillar (2.1) is increased, increasing the terrain unevenness that can be overcome and facilitating assembly, which in turn reduces the cost thereof.

Figure 4:
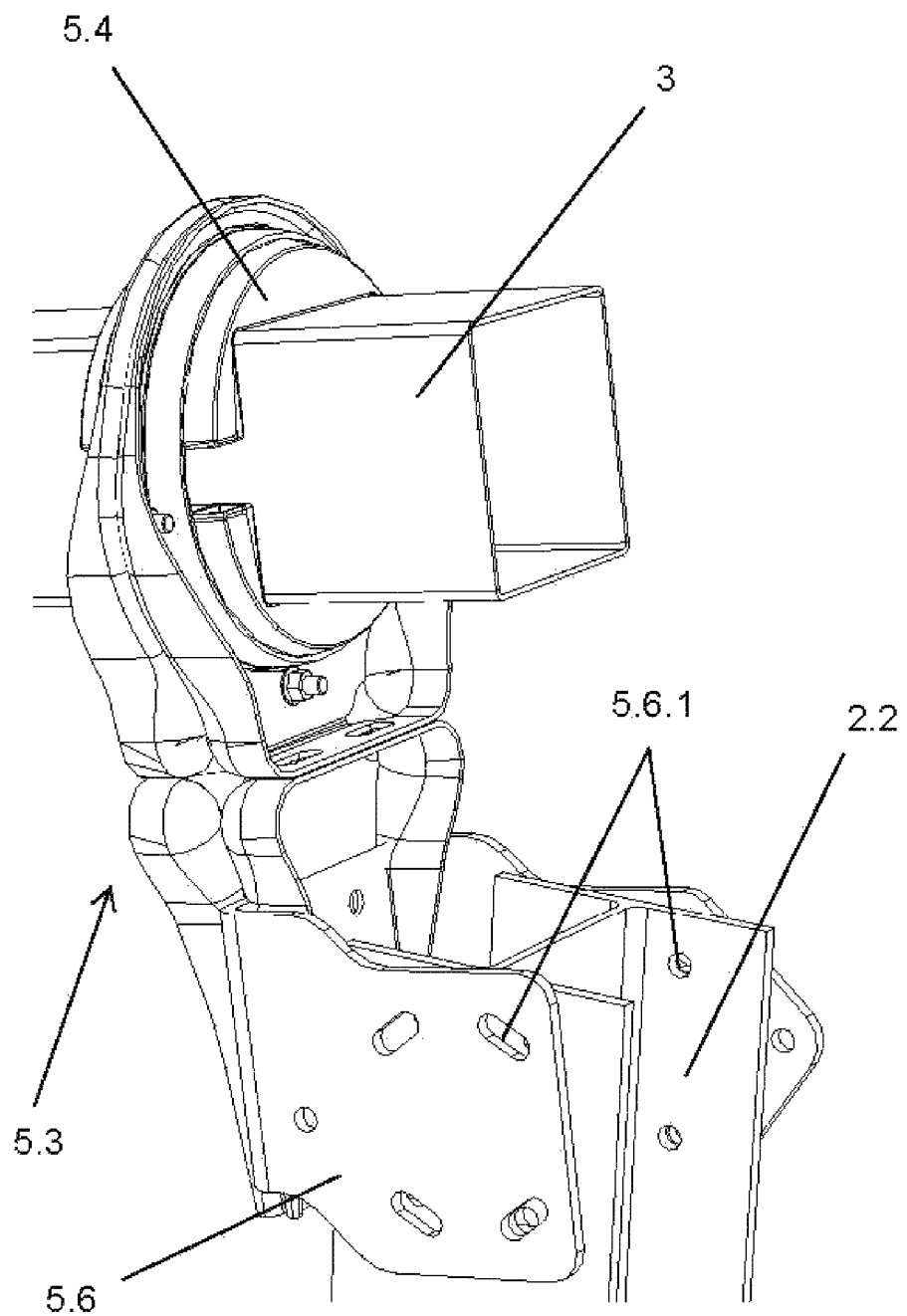
FIG. 4 shows a perspective view of a side pillar according to the embodiment of FIG. 1.

As can be seen in FIG. 4, a single rotating shaft (3) is supported on each side pillar (2.2) by means of a bearing assembly (5) comprising a spherical bearing (5.4) which allows the inclination of the respective rotating shaft (3) with respect to the side pillar (2.2), and a support (5.6) for fixing the bearing assembly (5) to the side pillar (2.2) by means of the fixing holes (5.6.1).

Figure 5:
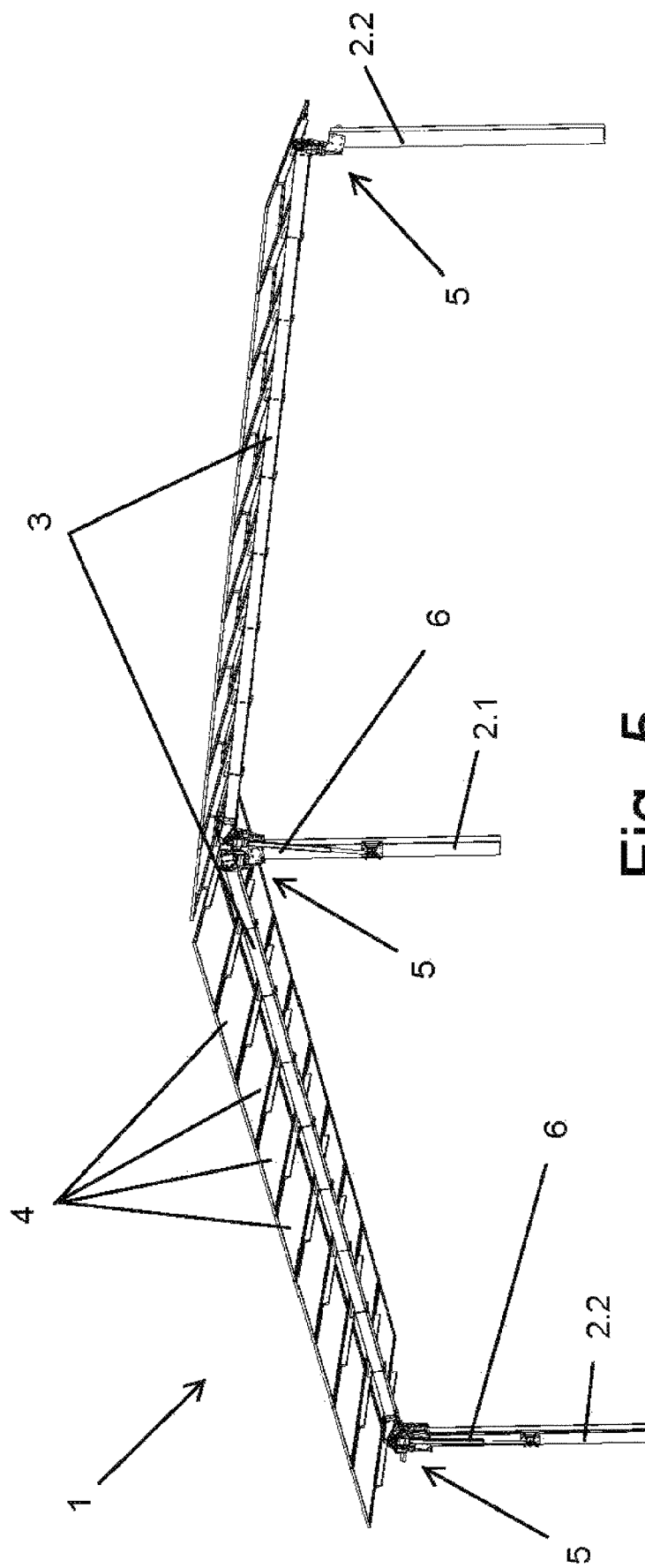
FIG. 5 shows a perspective view of a solar tracker according to another embodiment of the invention.

Another embodiment of the present invention can be seen in FIG. 5, in which the supporting system comprises actuation elements (6) to transmit a rotational movement to each of the rotating shafts (3), specifically in this embodiment the actuation elements (6) are linear actuators (6.1) respectively fixed to a side pillar (2.2) and to the supporting pillar (2.1).

Given that each rotating shaft (3) is actuated by independent linear actuators (6.1), the independent rotation of each rotating shaft (3) is achieved, allowing electricity generation to be maximized by allowing the photovoltaic panels (4) fixed to each rotating shaft (3) to rotate at a specific angle that maximizes electricity generation.

Figure 6:
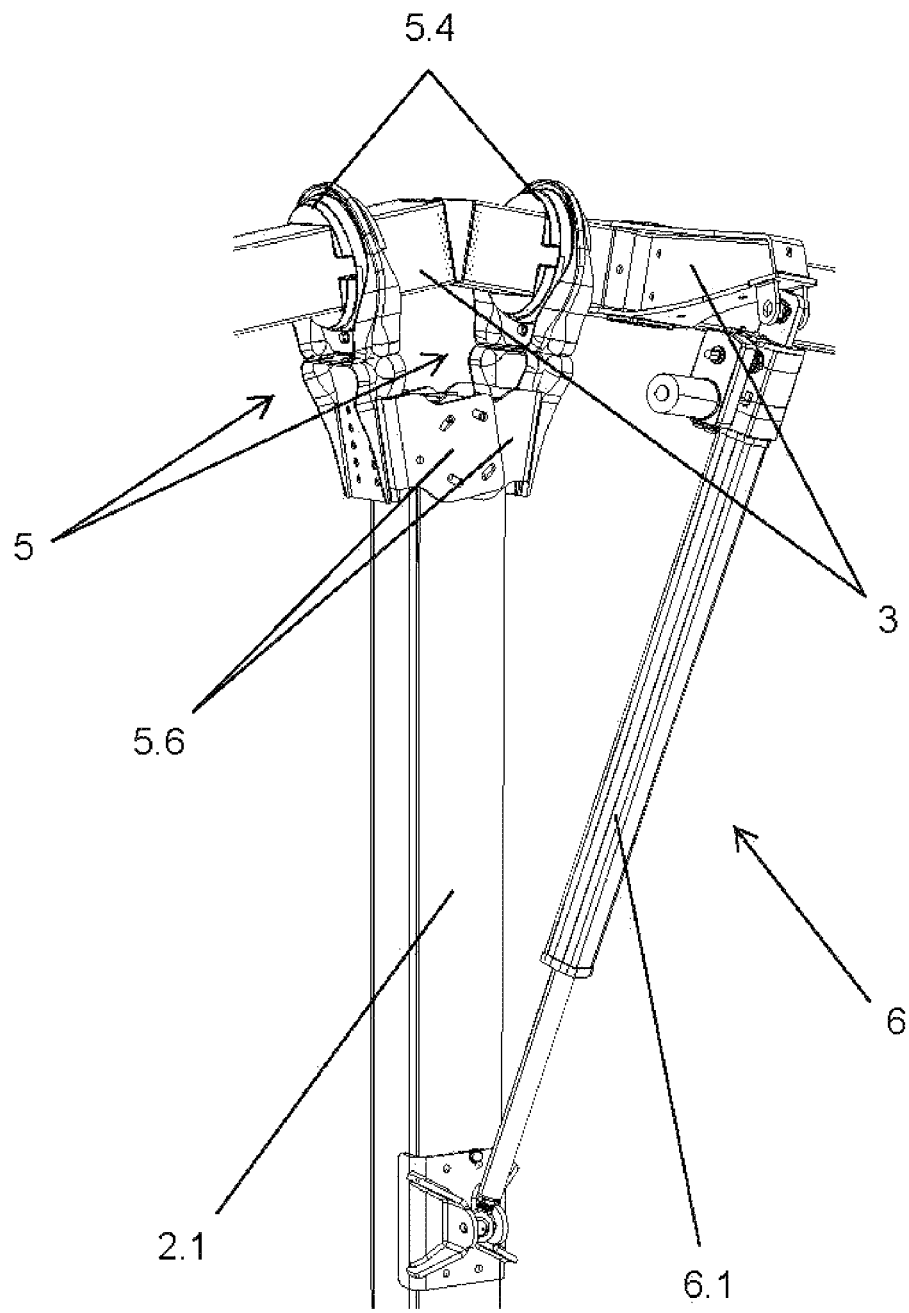
FIG. 6 shows a perspective view of a supporting pillar with an actuation element according to the embodiment of FIG. 5.

As can be verified in FIG. 6, the linear actuator (6.1) is fixed at one end to the pillar (2), either a supporting pillar (2.1) or one of the side pillars (2.2), and fixed at the other end to one of the rotating shafts (3) such that it transmits a rotational movement to said rotating shaft (3).

Likewise, since the linear actuator (6.1) is fixed to one of the already existing pillars (2) of the supporting system, a simple construction and assembly is achieved by utilizing the already existing pillar (2).

It should be mentioned that, although in this embodiment each linear actuator (6.1) is fixed to different pillars (2), the fixing of two linear actuators (6.1) to a single pillar (2), wherein each linear actuator (6.1) would actuate a different rotating shaft (3), is not ruled out.

Figure 7:
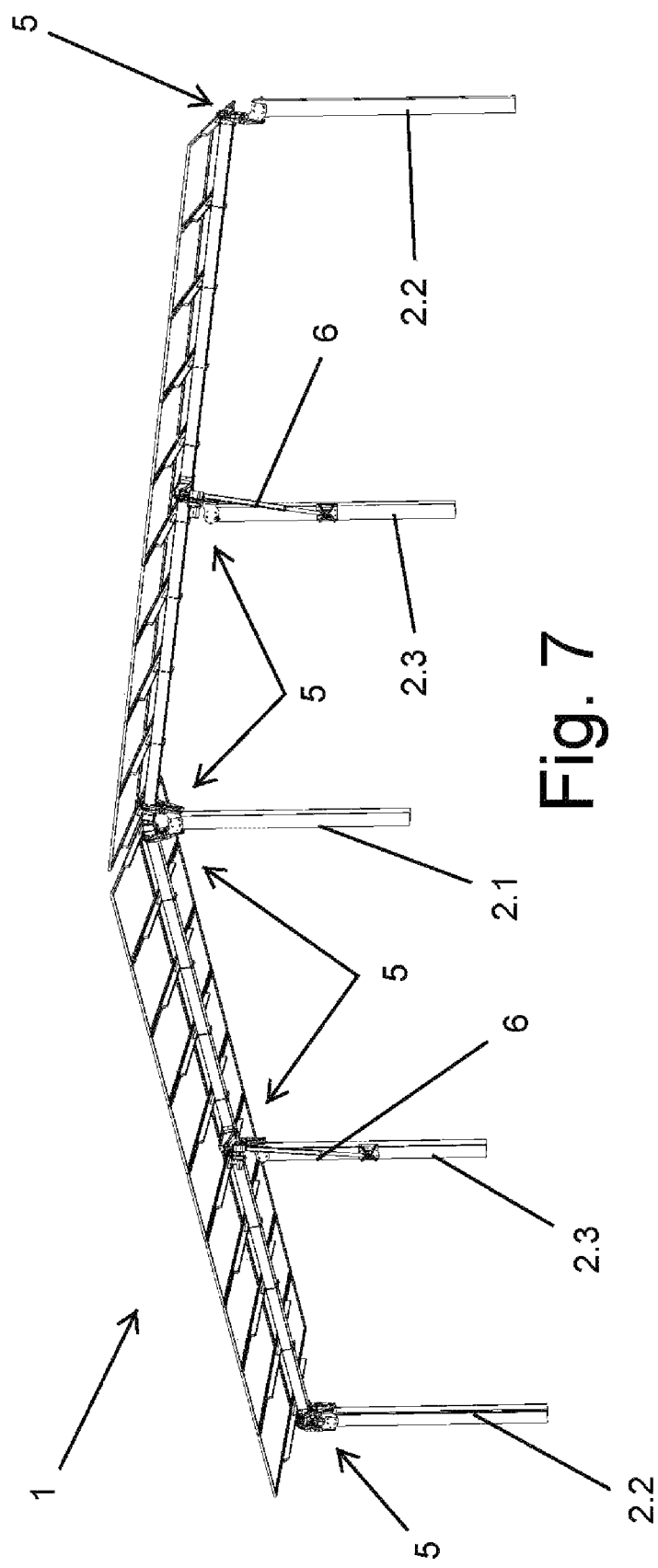
FIG. 7 shows a perspective view of a solar tracker according to another embodiment of the invention.
Figure 8:
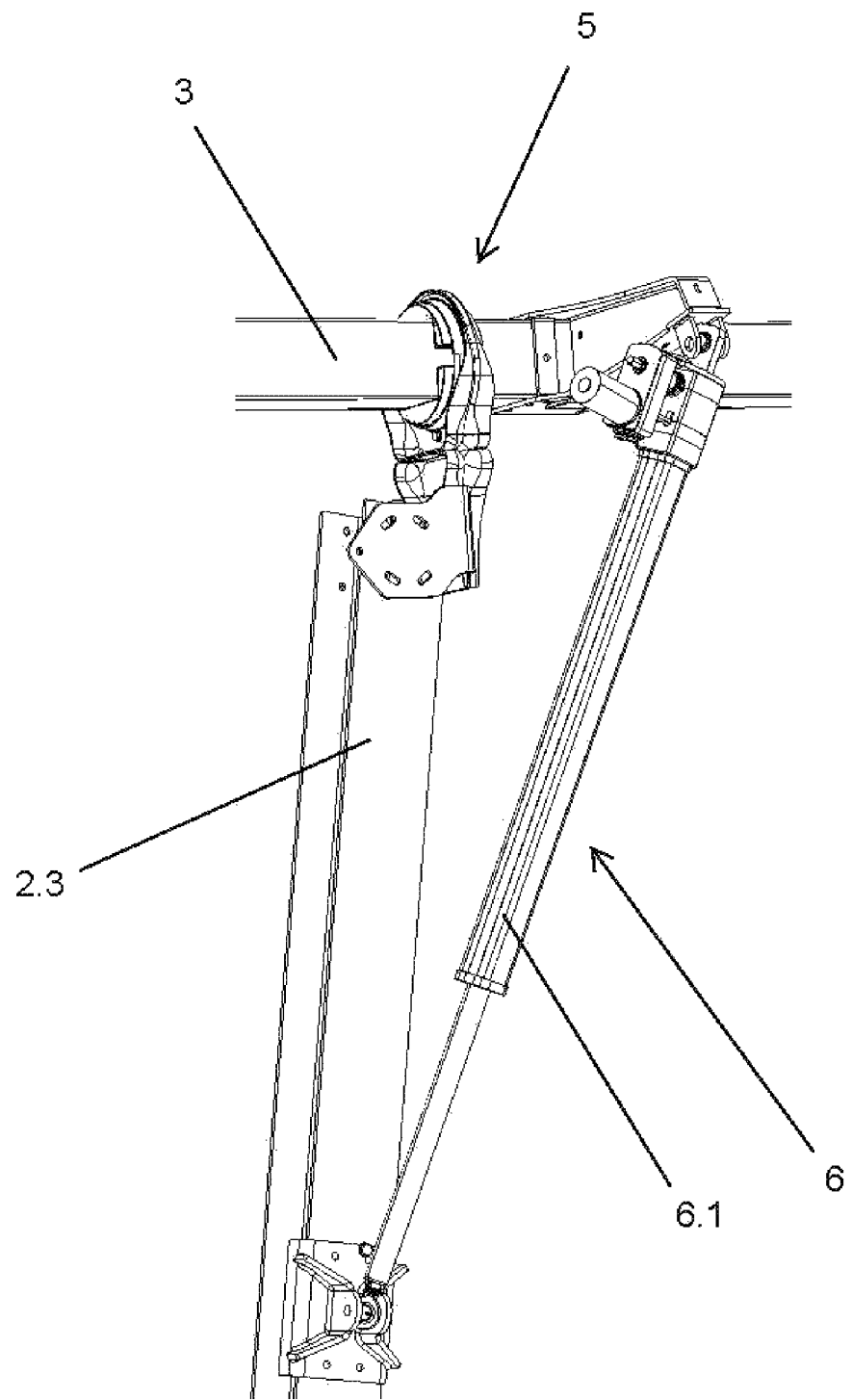
FIG. 8 shows a perspective view of an intermediate pillar with an actuation element according to the embodiment of FIG. 7.

In another embodiment, the supporting system comprises intermediate pillars (2.3) which, as can be seen in FIGS. 7 and 8, are located between the pillars (2) on which the ends of the rotating shafts (3) are supported.

Only one rotating shaft (3) is supported on each intermediate pillar (2.3) by means of a bearing assembly (5) comprising a spherical bearing (5.4) and a support (5.6) for fixing the bearing assembly (5) to the intermediate pillar (2.3).

The linear actuator (6.1) is fixed at one end to the intermediate pillar (2.3) and fixed at the other end to one of the rotating shafts (3) such that it transmits a rotational movement to said rotating shaft (3).

Since the rotational movement is transmitted to each rotating shaft (3) close to the longitudinal center thereof, load distribution is improved, increasing the service life of the different elements of the supporting system.

Likewise, given that each rotating shaft (3) is actuated by independent linear actuators (6.1), the independent rotation of each rotating shaft (3) is achieved, allowing electricity generation to be maximized by allowing the photovoltaic panels (4) fixed to each rotating shaft (3) to rotate at a specific angle that maximizes electricity generation.

Figure 9:
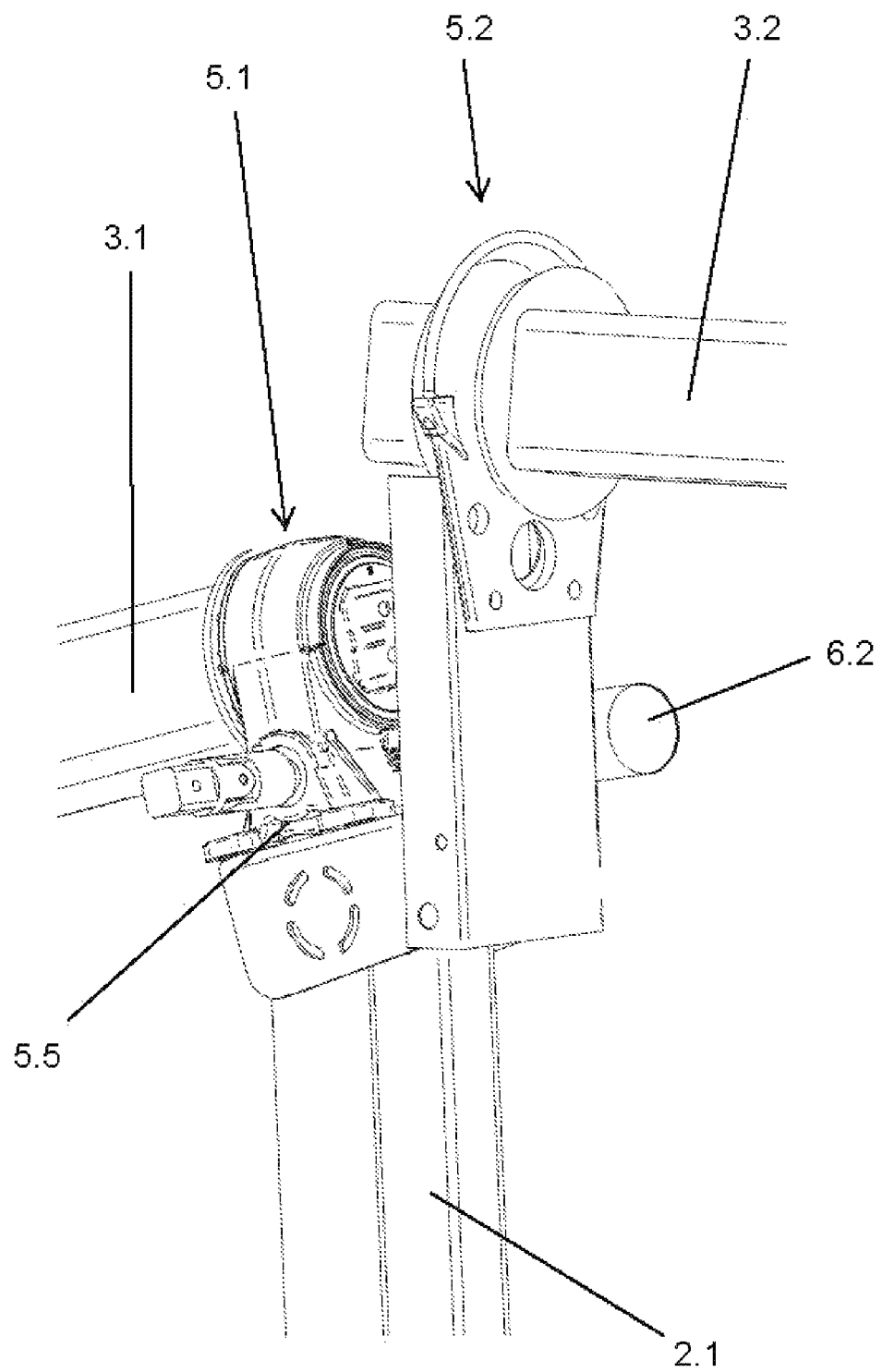
FIG. 9 shows a perspective view of a supporting pillar according to another embodiment of the invention.
Figure 10:
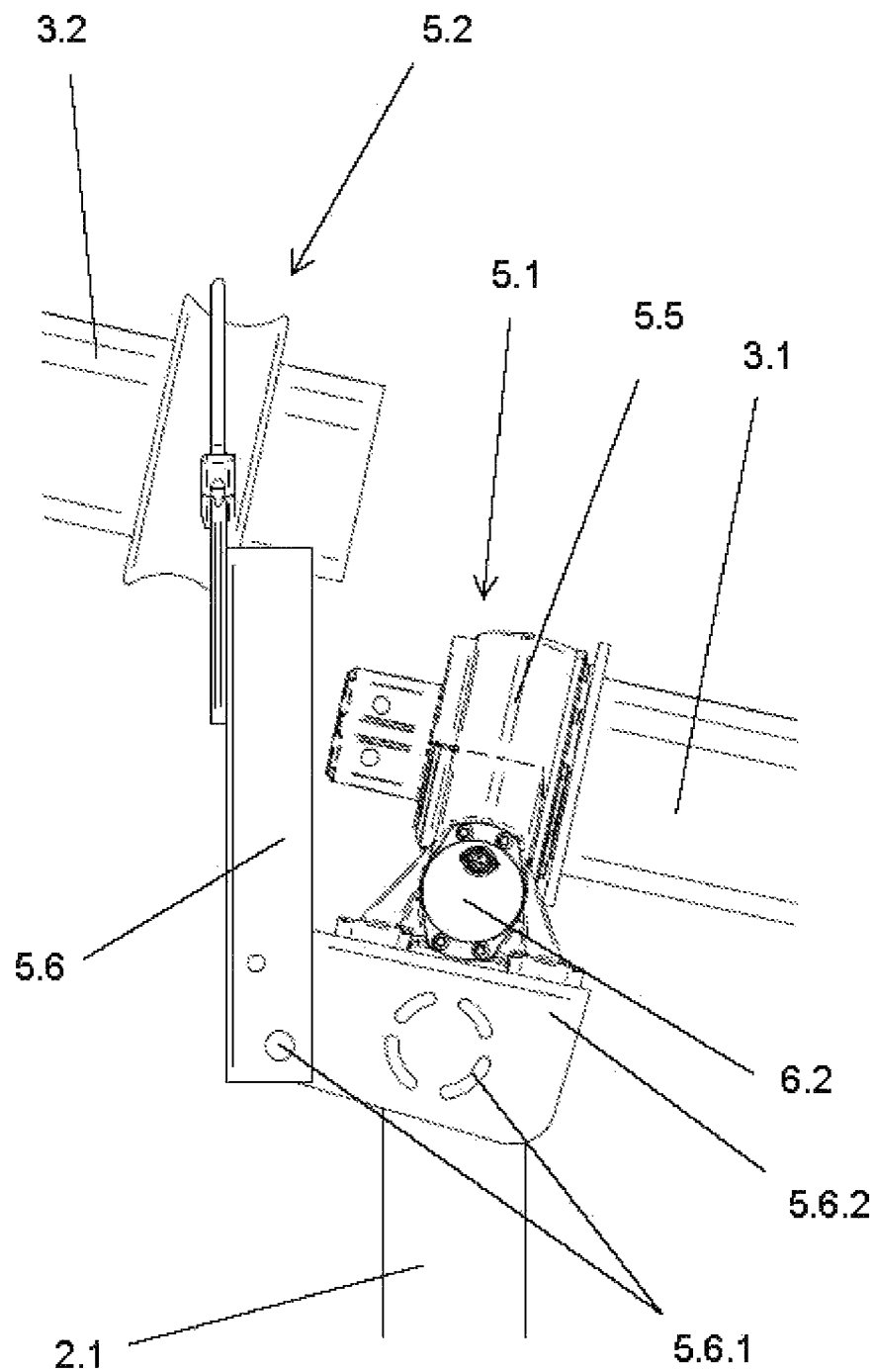
FIG. 10 shows a side view of the supporting pillar of FIG. 9.

In another embodiment, only one bearing assembly (5) fixed to the supporting pillar (2.1), on which two rotating shafts (3) are supported, comprises a spherical bearing (5.4), as can be seen in FIGS. 9 and 10.

In the specific case of FIGS. 9 and 10, the second bearing assembly (5.2) comprises a spherical bearing (5.4), whereas the first bearing assembly (5.1) would be coupled to an electric motor (6.2), which by means of a worm screw causes the bearing of the first rotating assembly (5.1) to rotate, with said first rotating assembly (5.1) being converted into an actuation element (6) which will be referred to as a rotation module (5.5) given that it transmits a rotational movement to the first rotating shaft (3.1) with which it is coupled.

This rotation module (5.5) comprises a module support (5.6.2) for the fixing thereof to the corresponding pillar (2), to that end, this module support (5.6.2) comprises fixing holes (5.6.1), such that this module support (5.6.2) can be aligned with the respective fixing holes (5.6.1) of the pillar (2).

Likewise, the fixing holes (5.6.1) of the module support (5.6.2) are elongated holes and configured to allow assembling the rotation module (5.5) in different fixing positions corresponding to different inclinations of the rotating shaft (3) it supports.

This is important because, since the rotation module (5.5) lacks a spherical bearing (5.4), the fixing of the module support (5.6.2) to the pillar (2) allows the inclination of the rotating shaft (3) with respect to the pillar (2).

Furthermore, given that the rotation module (5.5) must be properly fixed to the pillar (2), the module support (5.6.2) requires a larger surface of the pillar (2) for fixing, which hinders the ability to fix the second bearing assembly (5.2) to the aforementioned pillar (2).

To that end, the second bearing assembly (5.2) comprises a support (5.6) for the fixing thereof to the support (5.6) of the rotation module (5.5) by means of corresponding fixing holes (5.6.1).

Likewise, the support (5.6) of the second bearing assembly (5.2) projects in a direction away from the ground, such that the end of the second rotating shaft (3.2) is in a raised position with respect to the end of the first rotating shaft (3.1), preventing the second rotating shaft (3.2) from interfering with the rotation module (5.5) and/or the first rotating shaft (3.1).

However, the support (5.6) of the rotation module (5.5) being that projecting in a direction away from the ground, such that the end of the first rotating shaft (3.1) is in a raised position with respect to the end of the second rotating shaft (3.2), is not ruled out.

The invention claimed is:

1. A supporting system for rotating shafts which can be arranged inclined with respect to one another, comprising:
a supporting pillar,
a first rotating shaft which is supported on the supporting pillar by means of a first bearing assembly, and
a second rotating shaft which is supported on the supporting pillar by means of a second bearing assembly,
wherein the first bearing assembly and/or the second bearing assembly comprises a spherical bearing capable of rotating freely about a corresponding rotating shaft and out of a plane perpendicular to the first rotating shaft and the second rotating shaft.

2. The supporting system according to claim 1, wherein the first rotating shaft and the second rotating shaft can be actuated independently with respect to one another.

3. The supporting system according to claim 1, wherein the first bearing assembly and/or the second bearing assembly comprises an inclinable support, which can be removably fixed to the supporting pillar in different inclination positions corresponding to different inclinations of the corresponding rotating shaft which is supported on the supporting pillar.

4. The supporting system according to claim 3, wherein the support comprises fixing holes for fixing by screwing to the supporting pillar, which can be aligned with respective fixing holes of the supporting pillar in different fixing positions corresponding to the different inclinations of the corresponding rotating shaft which is supported on the supporting pillar.

5. The supporting system according to claim 1, comprising at least one actuation element fixed to the supporting pillar configured for rotating the first rotating shaft or the second rotating shaft.

6. The supporting system according to claim 1, comprising a plurality of supporting pillars on which respective first rotating shaft and second rotating shaft are supported.

7. The supporting system according to claim 1, comprising two side pillars on which respective first rotating shaft and second rotating shaft support by means of a third bearing assembly each end of the corresponding rotating shaft not supported on the supporting pillar (2.1).

8. The supporting system according to claim 7, wherein the third bearing assembly comprises a spherical bearing capable of rotating freely about the corresponding rotating shaft and out of the plane perpendicular to the rotating shaft, and/or an inclinable support which can be removably fixed to the supporting pillar in different inclination positions corresponding to different inclinations of the corresponding rotating shaft which is supported on the supporting pillar.

9. The supporting system according to claim 1 for a solar tracker (1) with photovoltaic panels (4) that can be oriented by means of rotating the corresponding rotating shaft.

10. A solar tracker, comprising the supporting system for the rotating shafts according to claim 1.

* * * * *